(12) United States Patent
Sano et al.

(10) Patent No.: US 8,906,255 B2
(45) Date of Patent: Dec. 9, 2014

(54) LITHIUM-ION SECONDARY BATTERY

(71) Applicant: TDK Corporation, Tokyo (JP)

(72) Inventors: Atsushi Sano, Tokyo (JP); Keitaro Otsuki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/846,257

(22) Filed: Mar. 18, 2013

(65) Prior Publication Data

US 2013/0256592 A1  Oct. 3, 2013

(30) Foreign Application Priority Data

Mar. 27, 2012 (JP) ................. 2012-070955
Mar. 13, 2013 (JP) ................. 2013-050352

(51) Int. Cl.

| | | |
|---|---|---|
| *H01M 4/48* | (2010.01) | |
| *H01M 4/58* | (2010.01) | |
| *H01M 10/0525* | (2010.01) | |
| *H01M 10/0567* | (2010.01) | |
| *H01M 10/42* | (2006.01) | |

(52) U.S. Cl.
CPC ........ *H01M 4/5825* (2013.01); *H01M 10/0525* (2013.01); *H01M 10/0567* (2013.01); *H01M 10/4235* (2013.01); *Y02E 60/122* (2013.01)
USPC ................. 252/182.1; 429/231.5; 429/231.95

(58) Field of Classification Search
CPC .......................... Y02E 60/122; H01M 4/5825
USPC ........................ 252/182.1; 429/231.5, 231.95
See application file for complete search history.

(56) References Cited

U.S. PATENT DOCUMENTS 6,645,452 B1 * 11/2003 Barker et al. ................. 423/306
7,001,690 B2 * 2/2006 Barker et al. ................. 429/221

FOREIGN PATENT DOCUMENTS

| JP | A-05-006778 | 1/1993 |
|---|---|---|
| JP | A-2004-303527 | 10/2004 |

* cited by examiner

*Primary Examiner* — Peter F Godenschwager
(74) *Attorney, Agent, or Firm* — Oliff PLC

(57) ABSTRACT

The lithium-ion secondary battery in which a positive electrode contains $Li_a(M)_b(PO_4)_cF_d$ (M=VO or V, $0.9 \leq a \leq 3.3$, $0.9 \leq b \leq 2.2$, $0.9 \leq c \leq 3.3$, $0 \leq d \leq 2.0$) as an active material and 1 to 300 ppm of sulfur is used.

2 Claims, 1 Drawing Sheet

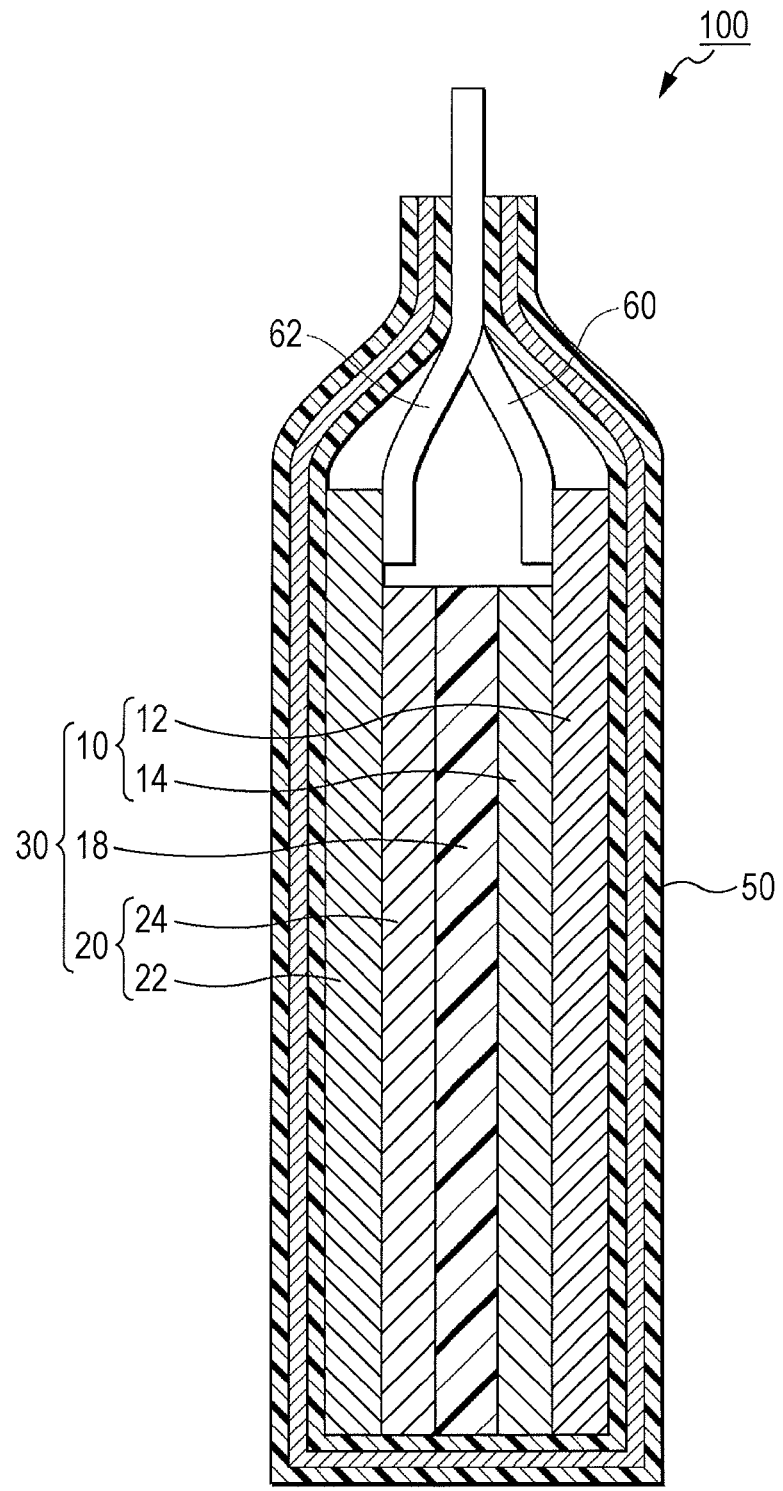

LITHIUM-ION SECONDARY BATTERY

BACKGROUND OF THE INVENTION

1. Field of the Invention

The present invention relates to a lithium-ion secondary battery.

2. Description of the Related Art

In the related art, laminar compounds such as $LiCoO_2$ and $LiNi_{1/3}Mn_{1/3}Co_{1/3}O_2$ and spinel compounds such as $LiMn_2O_4$ have been used as a positive electrode material (positive electrode active material) of a lithium-ion secondary battery. In recent years, olivine-type compounds represented by $LiFePO_4$ have attracted attention. The positive electrode material having the olivine structure has been known to have high thermal stability at a high temperature and to have a high safety.

However, a lithium-ion secondary battery using $LiFePO_4$ has defects that a charging/discharging voltage thereof is about 3.5 V, which is low, and energy density is lowered. Therefore, $LiCoPO_4$, $LiNiPO_4$ and the like have been proposed as phosphate positive electrode materials capable of realizing a high charging/discharging voltage. However, at present lithium-ion secondary batteries using these positive electrode materials cannot obtain a sufficient capacity. As a compound capable of realizing a 4V-grade charging/discharging voltage among the phosphate positive electrode materials, vanadium phosphates having structures of $LiVOPO_4$ and $Li_3V_2(PO_4)_3$ has been known.

It is not known that gas generation occurs in the lithium-ion secondary battery using the vanadium phosphate compound in some cases. However, gas is actually generated and the lithium-ion secondary battery is swollen to cause a problem that shape stability is impaired. In particular, when a metal laminated case is used, a change in the shape thereof is remarkable.

While there is a disclosure about vanadium phosphate in Japanese Unexamined Patent Application No. 2004-303527, a problem of gas generation is not disclosed. In Japanese Unexamined Patent Application No. 5-6778, in order to suppress gas generation, the addition of a small amount of water soluble polymer to a conductive carbon paste solution in a conductive layer on a negative electrode body is disclosed. However, a case in which vanadium phosphate is used as a positive electrode active material is not disclosed nor suggested.

SUMMARY OF THE INVENTION

The present invention is made to solve the problem of gas generation in the related art, and an object of the present invention is to provide a lithium-ion secondary battery capable of suppressing gas generation thereof.

According to the present invention, in order to achieve the object, there is provided a lithium-ion secondary battery including a positive electrode in which a positive electrode contains $Li_a(M)_b(PO_4)_cF_d$ (M=VO or V, $0.9 \le a \le 3.3$, $0.9 \le b \le 2.2$, $0.9 \le c \le 3.3$, $0 \le d \le 2.0$) as an active material and 1 to 300 ppm of sulfur.

Gas generation is suppressed in the lithium-ion secondary battery according to the present invention.

In the lithium-ion secondary battery according to the present invention, the active material of the positive electrode contains $LiVOPO_4$ or $Li_3V_2(PO_4)_3$.

Accordingly, the gas generation of the lithium-ion secondary battery can be remarkably suppressed.

According to the present invention, it is possible to provide the lithium-ion secondary battery capable of suppressing gas generation.

BRIEF DESCRIPTION OF THE DRAWINGS

FIG. 1 is a schematic cross-sectional view showing a lithium-ion secondary battery according to an embodiment.

DESCRIPTION OF THE PREFERRED EMBODIMENTS

In the following, a preferred embodiment of the present invention will be described with reference to the accompanying drawings. The present invention is not limited to the following embodiment. The constituents described below include constituents which can be easily assumed by those skilled in the art and substantially the same components. Furthermore, the constituents described below can be appropriately combined.

Vanadium phosphate as an active material according to the present invention can be expressed by the structural formula of $Li_a(M)_b(PO_4)_cF_d$ (M=VO or V, $0.9 \le a \le 3.3$, $0.9 \le b \le 2.2$, $0.9 \le c \le 3.3$, $0 \le d \le 2.0$). Specific examples thereof include $LiVOPO_4$, $Li_3V_2(PO_4)_3$ and $LiVOPO_4F$. In particular, when $LiVOPO_4$ is used, a high effect of suppressing gas generation is confirmed. It is considered that this is because sulfur strongly interacts in particular with vanadium of the positive electrode to obtain an effect of suppressing an active site associated with gas generation.

It is known that the vanadium phosphate can be synthesized by solid-phase synthesis, hydrothermal synthesis, a carbon thermal reduction method, and the like. Among these methods, vanadium phosphate prepared by the hydrothermal synthesis has a small particle diameter and a tendency to be excellent in rate performance, and the vanadium phosphate prepared by the hydrothermal synthesis is preferable as the positive electrode active material. The vanadium phosphate prepared by the hydrothermal synthesis generates a small amount of gas. It is assumed that this is because vanadium phosphate prepared by the hydrothermal synthesis has few defects and active sites that cause gas generation.

Sulfur can be mixed to the positive electrode. The raw material of sulfur is not limited in particular, and organic sulfur compounds such as a sulfur single substance such as α-sulfur, β-sulfur and γ-sulfur, a sulfur oxide such as $SO_2$, chloride such as $SCl_2$, sulfite such as $Li_2SO_3$, sulfate such as $Li_2SO_4$, cyclic sulfurous ester such as 1,3-propane sultone and chain sulfurous ester, cyclic sulfate ester, chain sulfate ester and the decomposition product thereof can be used.

The sulfur amount contained in the positive electrode is preferably 1 to 300 ppm, and more preferably 5 to 100 ppm. When the sulfur amount is less than 1 ppm, gas is easily generated, and when the sulfur amount is more than 300 ppm, gas is easily generated. The sulfur amount contained in the positive electrode can be obtained by the inductively coupled plasma emission spectrometry (ICP emission spectrometry).

As an electrolyte, an electrolyte in which a lithium salt is dissolved in a nonaqueous solvent (organic solvent) is used. Examples of the lithium salt include salts such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. These salts may be used either singly or in combination of two kinds or more.

In addition, as the organic solvent, a mixture of cyclic carbonate and chain carbonate can be used. Examples of the cyclic carbonate preferably include propylene carbonate, ethylene carbonate, and fluoroethylene carbonate, and examples of the chain carbonate preferably include diethyl carbonate, dimethyl carbonate, and methyl ethyl carbonate. These carbonates may be used either singly or in combination of two kinds or more at an arbitrary ratio. From a viewpoint of the balance of discharge capacity and cycle characteristics, it is particularly preferable to contain at least two kinds of ethylene carbonate and diethyl carbonate.

The lithium-ion secondary battery according to the embodiment can suppress gas generated at the time of charging/discharging. The mechanism thereof is assumed as follows. It is considered that the electrolyte is subjected to oxidative decomposition on the surface of vanadium phosphate as the positive electrode so that gas is generated. The sulfur contained in the positive electrode forms a film on the surface of the positive electrode to suppress the positive electrode from being in contact with the electrolyte, and the decomposition of the electrolyte on the surface of the positive electrode is suppressed. Therefore, it is considered that gas generation is suppressed.

It is considered that the sulfur contained in the positive electrode is present on the surface of the vanadium phosphate to reduce a reaction active site of the vanadium phosphate. As a result, it is considered that the reaction of the vanadium phosphate and the electrolyte is suppressed and thus, gas generation is suppressed.

As shown in FIG. 1, a lithium-ion secondary battery 100 according to the embodiment includes a power generating element 30 having a plate-like negative electrode 20 and a plate-like positive electrode 10 arranged to oppose each other and a plate-like separator 18 adjacently arranged between the negative electrode 20 and the positive electrode 10, an electrolyte containing lithium ions, a case 50 accommodating the electrolyte and the power generating element in a sealed state, a negative electrode lead 62 in which one edge part is electrically connected to the negative electrode 20 and the other edge part is protruded outside of the case, and a positive electrode lead 60 in which one edge part is electrically connected to the positive electrode 10 and the other edge part is protruded outside of the case.

The negative electrode 20 has a negative electrode current collector 22 and a negative electrode active material layer 24 stacked on the negative electrode current collector 22. In addition, the positive electrode 10 has a positive electrode current collector 12 and a positive electrode active material layer 14 stacked on the positive electrode current collector 12. The separator 18 is disposed between the negative electrode active material layer 24 and the positive electrode active material layer 14.

The positive electrode active material layer 14 contains at least an active material according to the embodiment and a conductive auxiliary agent. Examples of the conductive auxiliary agent include carbon materials such as carbon black, metal powders such as copper, nickel, stainless, and iron, mixtures of the carbon materials and the metal powders, and conductive oxides such as ITO. The positive electrode active material layer may contain a binder which binds the active material and the conductive auxiliary agent. The positive electrode active material layer 14 is formed through a step of applying a coating material including the vanadium phosphate, the binder, the solvent, and the conductive auxiliary agent on the positive electrode current collector 12. Sulfur can be contained in the positive electrode by kneading the organic compound including sulfur such as 1,3-propane sultone, or by kneading an inorganic sulfur compound such as sulfur and sulfate with the coating material. In addition, sulfur can be contained in the positive electrode by adding an organic compound containing sulfur to the electrolyte.

Examples of the negative electrode active material contained in the negative electrode active material layer 24 include carbon materials such as natural graphite, synthetic graphite, hard carbon, soft carbon, low temperature fired carbon, metals such as Al, Si (silicon), Sn and Si which are combinable with lithium, or alloys, amorphous compounds mainly composed of oxides such as $SiO_x$ ($1<x\leq2$) (silicon oxide) and $SnO_x$ ($1<x\leq2$), lithium titanate ($Li_4Ti_5O_{12}$), and $TiO_2$. The negative electrode active material may be bound by a binder. The negative electrode active material layer 24 is formed through a step of applying a coating material containing the negative electrode active material and the like onto the negative electrode current collector 22, as in the case of the positive electrode active material layer 14. Among these examples, when silicon and silicon oxide are used as the negative electrode active material, gas generation is suppressed. It is considered that this because a substance which causes gas generation in the positive electrode reacts with silicon. When silicon and silicon oxide are mixed with carbon of graphite to be used, there is an effect of suppressing gas generation.

Moreover, the separator 18 may have an electrically insulating porous structure, examples of which include a monolayer or stacked bodies of films constituted by polyethylene, polypropylene, or polyolefin, extended films of mixtures of these resins, and fibrous nonwoven fabrics constituted by at least one kind of constituent material selected from the group consisting of cellulose, polyester, and polypropylene.

The case 50 is one which seals the power generating element 30 and electrolyte therein. The case 50 is not limited in particular as long as a material can inhibit the electrolyte from leaking out therefrom and moisture and the like from invading the lithium-ion secondary battery 100 from the outside. For example, it is desirable to use a metal laminated film as the case 50 from viewpoint of lightening the weight and a high degree of freedom in the shape.

The leads 60 and 62 are formed from a conductive material such as aluminum.

Form the above, a preferred embodiment of the lithium-ion secondary battery according to the present invention is described in detail and the present invention is not limited to the above-described embodiment.

EXAMPLES

Hereinafter, the present invention will be described in more detail with reference to Examples and Comparative Examples, and will not be limited to the following examples.

Example 1

$V_2O_5$, LiOH and $H_3PO_4$ were prepared at a mole ratio of about 1:2:2 and heated at 160° C. for 8 hours in a sealed container to fire an obtained paste at 600° C. for 4 hours in the atmosphere. It was found that the particles obtained in this manner were $\beta$-LiVOPO$_4$. The LiVOPO$_4$ particles and acetylene black were weighed at a weight ratio of 90:10.

The mixture and polyvinylidene fluoride (PVDF) as a binder were mixed and the resultant was dispersed in N-methyl-2-pyrrolidone (NMP) as a solvent to prepare a slurry. Then, the weight ratio of the mixture and PVDF in the slurry was adjusted to 90:10. After the slurry was applied onto an aluminum foil as a current collector, dried, and pressed, an electrode (positive electrode) in which an active material layer was formed was obtained.

Next, synthetic graphite as a negative electrode and a solution of 5 wt % of N-methylpyrrolidone (NMP) of polyvinylidene fluoride (PVDF) were mixed to have a ratio of synthetic graphite:polyvinylidene fluoride=93:7. Then, a slurry coating material was prepared. The coating material was applied to a copper foil as a current collector, dried, and pressed to prepare a negative electrode. The positive electrode and the negative electrode were stacked with a separator made of a polyethylene microporous film interposed therebetween to obtain a stacked body (matrix). The stacked body was put into an aluminum laminated pack.

As for an electrolyte, ethylene carbonate (EC) and diethyl carbonate (DEC) were mixed at a volume ratio of 3:7, $LiPF_6$ as a supporting electrolyte was dissolved to be 1 mol/L. 0.2% by weight of 1,3-propane sultone with respect to the electrolyte was added. The electrolyte was injected in the aluminum laminated pack in which the stacked body had been put and was sealed in vacuum, so as to prepare an evaluation cell of Example 1. The sulfur amount contained in the positive electrode was obtained by the inductively coupled plasma emission spectrometry (ICP emission spectrometry).

An evaluation cell of Example 2 was prepared as in Example 1 except that the amount of 1,3-propane sultone that was added to the electrolyte was 0.5% by weight.

An evaluation cell of Example 3 was prepared as in Example 1 except that the amount of 1,3-propane sultone that was added to the electrolyte was 1% by weight.

An evaluation cell of Example 4 was prepared as in Example 1 except that the amount of 1,3-propane sultone that was added to the electrolyte was 2.5% by weight.

An evaluation cell of Example 5 was prepared as in Example 1 except that the amount of 1,3-propane sultone that was added to the electrolyte was 4.5% by weight.

An evaluation cell of Example 6 was prepared as in Example 1 except that $LiVOPO_4$ synthesized by the solid-phase synthesis was used as the positive electrode active material, and the amount of 1,3-propane sultone that was added to the electrolyte was 2% by weight.

The $LiVOPO_4$ particles and acetylene black were weighed at a weight ratio of 90:10. The mixture and polyvinylidene fluoride (PVDF) as a binder were mixed and the resultant was dispersed in N-methyl-2-pyrrolidone (NMP) as a solvent to prepare a slurry. Then, the weight ratio of the mixture and PVDF in the slurry was adjusted to 90:10. $Li_2SO_4$ was added to the slurry to be 0.001% by weight with respect to a total solid content. After the slurry was applied onto an aluminum foil as a current collector, dried, and pressed, an electrode (positive electrode) in which an active material layer was formed was obtained. An evaluation cell of Example 7 was prepared through the same subsequent steps as in Example 1.

An evaluation cell of Example 8 was prepared as in Example 7 except that an additive amount of $Li_2SO_4$ was 0.005% by weight.

An evaluation cell of Example 9 was prepared as in Example 7 except that an additive amount of $Li_2SO_4$ was 0.01% by weight.

An evaluation cell of Example 10 was prepared as in Example 7 except that an additive amount of $Li_2SO_4$ was 0.03% by weight.

An evaluation cell of Example 11 was prepared as in Example 7 except that 0.01% by weight of elemental sulfur was used instead of $Li_2SO_4$.

An evaluation cell of Example 12 was prepared as in Example 7 except that 0.01% by weight of $Li_2SO_3$ was used instead of $Li_2SO_4$.

An evaluation cell of Example 13 was prepared as in Example 1 except that $Li_3V_2(PO_4)_3$ synthesized by the hydrothermal synthesis was used as a positive electrode active material.

An evaluation cell of Example 14 was prepared as in Example 2 except that $Li_3V_2(PO_4)_3$ was used as a positive electrode active material.

An evaluation cell of Example 15 was prepared as in Example 3 except that $Li_3V_2(PO_4)_3$ was used as a positive electrode active material.

An evaluation cell of Example 16 was prepared as in Example 4 except that $Li_3V_2(PO_4)_3$ was used as a positive electrode active material.

An evaluation cell of Example 17 was prepared as in Example 5 except that $Li_3V_2(PO_4)_3$ was used as a positive electrode active material.

An evaluation cell of Example 18 was prepared as in Example 6 except that $Li_3V_2(PO_4)_3$ synthesized by the hydrothermal synthesis was used as a positive electrode active material.

An evaluation cell of Example 19 was prepared as in Example 6 except that $LiVPO_4F$ synthesized by the solid-phase synthesis was used as a positive electrode active material.

An evaluation cell of Example 20 was prepared as in Example 6 except that when the coating material was prepared by kneading the positive electrode, 1,3-propane sultone was mixed in the coating material and 1,3-propane sultone was not added to the electrolyte.

An evaluation cell of Comparative Example 1 was prepared as in Example 1 except that that 1,3-propane sultone was not added to the electrolyte and a sulfur compound was not added to the positive electrode.

An evaluation cell of Comparative Example 2 was prepared as in Example 7 except that 0.1% by weight of $Li2_sO_4$ was added.

An evaluation cell of Example 21 was prepared as in Example 6 except that the amount of 1,3-propane sultone in the electrolyte was 1% by weight.

An evaluation cell of Example 22 was prepared as in Example 6 except that the amount of 1,3-propane sultone in the electrolyte was 4.5% by weight.

A mixture in which silicon oxide and silicon were mixed at a ratio of 1:1 was used as the negative electrode and the mixture was mixed with a solution of 20 wt % of N-methylpyrrolidone (NMP) of polyamideimide (PAI) so that a ratio of a total weight of silicon oxide and silicon:PAI weight=90:10. Therefore, a slurry coating material was prepared. After the coating material was applied to a copper foil as a current collector, dried, and pressed, a negative electrode was prepared. An evaluation cell of Example 23 was prepared as in Example 3 except that the above-mentioned negative electrode was used.

An evaluation cell of Example 24 was prepared as in Example 23 except that the amount of 1,3-propane sultone in the electrolyte was 2.5% by weight.

An evaluation cell of Example 25 was prepared as in Example 23 except that the amount of 1,3-propane sultone in the electrolyte was 4.5% by weight.

A mixture in which silicon oxide, silicon and graphite were mixed at a ratio of 0.5:0.5:9 was used as a negative electrode, and the mixture was mixed with a solution of 20 wt % of N-methylpyrrolidone (NMP) of polyamideimide (PAI) so that a ratio of a total weight of silicon oxide, silicon and graphite:PAI weight=90:10. Therefore, a slurry coating material was prepared. After the coating material was applied to a copper foil as a current collector, dried, and pressed, a negative electrode was prepared. An evaluation cell of Example 26 was prepared as in Example 3 except that the above-mentioned negative electrode was used.

An evaluation cell of Example 27 was prepared as in Example 26 except that the amount of 1,3-propane sultone in the electrolyte was 2.5% by weight.

An evaluation cell of Example 28 was prepared as in Example 26 except that the amount of 1,3-propane sultone in the electrolyte was 4.5% by weight.

Constant current-constant voltage charging was carried out on the prepared evaluation cells at a rate of 0.1 C up to 4.3 V. In the charging state, a gas generation amount was obtained. The gas generation amount was measured by the Archimedes method. Specifically, the cells were immersed into pure water and the buoyant force was measured to obtain a gas generation amount from the increased volume of the water.

As shown in Table 1, it was apparent that gas generation could be suppressed in Examples 1 to 28 and there was no gas generation suppression effect in Comparative Examples 1 and 2.

TABLE 1

|  | | Positive electrode active material | Synthesis method | Negative electrode | Sulfur source | Additive amount of sulfur source (wt %) | Additive amount of sulfur contained in positive electrode (ppm) | Gs generation rate (%) |
|---|---|---|---|---|---|---|---|---|
| Example | 1 | LiVOPO$_4$ | Hydrothermal synthesis | Graphite | 1,3-propane sultone | 0.2 | 1 | 24.5 |
| Example | 2 | LiVOPO$_4$ | Hydrothermal synthesis | Graphite | 1,3-propane sultone | 0.5 | 5.8 | 19.3 |
| Example | 3 | LiVOPO$_4$ | Hydrothermal synthesis | Graphite | 1,3-propane sultone | 1 | 21 | 12.3 |
| Example | 4 | LiVOPO$_4$ | Hydrothermal synthesis | Graphite | 1,3-propane sultone | 2.5 | 52 | 8.8 |
| Example | 5 | LiVOPO$_4$ | Hydrothermal synthesis | Graphite | 1,3-propane sultone | 4.5 | 87 | 12.5 |
| Example | 6 | LiVOPO$_4$ | Solid-phase synthesis | Graphite | 1,3-propane sultone | 2 | 28 | 21.1 |
| Example | 7 | LiVOPO$_4$ | Hydrothermal synthesis | Graphite | Li$_2$SO$_4$ | 0.001 | 8 | 13.8 |
| Example | 8 | LiVOPO$_4$ | Hydrothermal synthesis | Graphite | Li$_2$SO$_4$ | 0.005 | 46 | 11.3 |
| Example | 9 | LiVOPO$_4$ | Hydrothermal synthesis | Graphite | Li$_2$SO$_4$ | 0.01 | 87 | 9.7 |
| Example | 10 | LiVOPO$_4$ | Hydrothermal synthesis | Graphite | Li$_2$SO$_4$ | 0.03 | 300 | 25.7 |
| Example | 11 | LiVOPO$_4$ | Hydrothermal synthesis | Graphite | S$_8$ | 0.01 | 52 | 13.3 |
| Example | 12 | LiVOPO$_4$ | Hydrothermal synthesis | Graphite | Li$_2$SO$_4$ | 0.01 | 83 | 15.9 |
| Example | 13 | Li$_3$V$_2$(PO$_4$)$_3$ | Hydrothermal synthesis | Graphite | 1,3-propane sultone | 0.2 | 1.6 | 29.8 |
| Example | 14 | Li$_3$V$_2$(PO$_4$)$_3$ | Hydrothermal synthesis | Graphite | 1,3-propane sultone | 0.5 | 6.9 | 24.2 |
| Example | 15 | Li$_3$V$_2$(PO$_4$)$_3$ | Hydrothermal synthesis | Graphite | 1,3-propane sultone | 1 | 25 | 16.8 |
| Example | 16 | Li$_3$V$_2$(PO$_4$)$_3$ | Hydrothermal synthesis | Graphite | 1,3-propane sultone | 2.5 | 63 | 28.7 |
| Example | 17 | Li$_3$V$_2$(PO$_4$)$_3$ | Hydrothermal synthesis | Graphite | 1,3-propane sultone | 4.5 | 92 | 34.3 |
| Example | 18 | Li$_3$V$_2$(PO$_4$)$_3$ | Hydrothermal synthesis | Graphite | 1,3-propane sultone | 2 | 28 | 19.3 |
| Example | 19 | LiVPO$_4$F | Solid-phase synthesis | Graphite | 1,3-propane sultone | 2 | 21 | 31.1 |
| Example | 20 | LiVOPO$_4$ | Hydrothermal synthesis | Graphite | 1,3-propane sultone | 2 | 51 | 23.3 |
| Comparative Example | 1 | LiVOPO$_4$ | Hydrothermal synthesis | Graphite | None | 0 | 0 | 55.3 |
| Comparative Example | 2 | LiVOPO$_4$ | Hydrothermal synthesis | Graphite | Li$_2$SO$_4$ | 0.1 | 380 | 39.2 |
| Example | 21 | LiVOPO$_4$ | Solid-phase synthesis | Graphite | 1,3-propane sultone | 1 | 21 | 12.3 |
| Example | 22 | LiVOPO$_4$ | Solid-phase synthesis | Graphite | 1,3-propane sultone | 4.5 | 87 | 12.5 |
| Example | 23 | LiVOPO$_4$ | Hydrothermal synthesis | Silicon oxide + Silicone | 1,3-propane sultone | 1 | 34 | 7.5 |
| Example | 24 | LiVOPO$_4$ | Hydrothermal synthesis | Silicon oxide + Silicone | 1,3-propane sultone | 2.5 | 69 | 5.3 |
| Example | 25 | LiVOPO$_4$ | Hydrothermal synthesis | Silicon oxide + Silicone | 1,3-propane sultone | 4.5 | 96 | 8.5 |
| Example | 26 | LiVOPO$_4$ | Hydrothermal synthesis | Silicon oxide + Silicone + Graphite | 1,3-propane sultone | 1 | 27 | 10.8 |
| Example | 27 | LiVOPO$_4$ | Hydrothermal synthesis | Silicon oxide + Silicone + Graphite | 1,3-propane sultone | 2.5 | 58 | 8.1 |
| Example | 28 | LiVOPO$_4$ | Hydrothermal synthesis | Silicon oxide + Silicone + Graphite | 1,3-propane sultone | 4.5 | 91 | 11.6 |

What is claimed is:

1. A lithium-ion secondary battery comprising a positive electrode comprising:

$Li_a(M)_b(PO_4)_cF_d$ as an active material, where:
 M is VO or V,
 $0.9 \leq a \leq 3.3$,
 $0.9 \leq b \leq 2.2$,
 $0.9 \leq c \leq 3.3$, and
 $0 \leq d \leq 2.0$, and
1 to 300 ppm of sulfur contained on a surface of the active material.

2. The lithium-ion secondary battery according to claim 1, wherein the active material contains $LiVOPO_4$ or $Li_3V_2(PO_4)_3$.

* * * * *